United States Patent [19]

Sakai et al.

[11] Patent Number: 4,690,541

[45] Date of Patent: Sep. 1, 1987

[54] COLOR ELECTROPHOTOGRAPHIC COPYING PROCESS

[75] Inventors: Yoshihiro Sakai, Tokyo; Ituso Ikeda; Katsuo Sakai, both of Kanagawa; Tsukasa Adachi, Tokyo; Satoshi Shinguryo, Saitama; Hideya Furuta, Kanagawa, all of Japan

[73] Assignee: Ricoh Company, Ltd., Tokyo, Japan

[21] Appl. No.: 771,069

[22] Filed: Aug. 30, 1985

[30] Foreign Application Priority Data

| Aug. 30, 1984 | [JP] | Japan | 59-181459 |
| Sep. 17, 1984 | [JP] | Japan | 59-194258 |
| Sep. 17, 1984 | [JP] | Japan | 59-194259 |
| Sep. 21, 1984 | [JP] | Japan | 59-198368 |
| Sep. 28, 1984 | [JP] | Japan | 59-203806 |

[51] Int. Cl.$^4$ .................. G03G 13/01; G03G 15/01
[52] U.S. Cl. .................. 355/4; 355/14 E
[58] Field of Search .................. 355/1, 3 R, 4, 14 E, 355/14 R

[56] References Cited

U.S. PATENT DOCUMENTS

| 3,986,771 | 10/1976 | Tsukada | 355/4 X |
| 4,046,472 | 9/1977 | Eichorn et al. | 355/14 R |
| 4,122,462 | 10/1978 | Hirayama et al. | 354/5 |
| 4,153,364 | 5/1979 | Suzuki et al. | 355/14 E |
| 4,166,691 | 9/1979 | Ebi et al. | 355/3 DD X |
| 4,215,930 | 8/1980 | Miyakawa et al. | 355/14 E X |
| 4,236,809 | 12/1980 | Kermisch | 355/4 |
| 4,239,374 | 12/1980 | Tatsumi et al. | 355/14 E |
| 4,318,597 | 3/1982 | Kotani et al. | 355/1 X |
| 4,469,433 | 9/1984 | Kurata et al. | 355/4 |

Primary Examiner—Fred L. Braun
Attorney, Agent, or Firm—Oblon, Fisher, Spivak, McClelland & Maier

[57] ABSTRACT

A color electrophotographic copying process utilizing the Carlson process. A colored original to be copied is color-separated and read by a solid-state image pickup device. Color compensation or gradation compensation is carried out on the basis of the data read by the solid-state image pickup device. When the color compensation is effected, amounts of masking are determined on the basis of the data read by the solid-state image pickup device, and the color-separated latent images are partially erased in an area-modulating manner dependent on the determined amounts of masking with an eraser having a light-emitting dot array. When the gradation compensation is effected, the latent images are partially erased with the eraser in an area-modulating manner dependent on the determined amounts of masking, or an appropriate gradation reproduction curve is selected on the basis of the data read by the solid-state image pickup device.

16 Claims, 18 Drawing Figures

F I G. 2

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| 42 → | 1.40 | 1.20 | 1.00 | 0.90 | 0.80 | 0.70 | 0.60 | 0.50 | 0.40 | 0.35 | 0.30 | 0.25 | 0.20 | 0.15 | 0.10 | 0.05 |

| 403F → | B | R | G | B | R | G | B | R | G | B | R | G | B | R | G | B | R | G | B | R | G | B | R | G | B | R | G | B | R | G | B | R | G | B | R | G | B | R | G | B | R | G | B | R | G | B |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|

| RED | 0.04 | 0.06 | 0.10 | 0.13 | 0.16 | 0.20 | 0.25 | 0.32 | 0.40 | 0.45 | 0.50 | 0.56 | 0.63 | 0.71 | 0.79 | 0.89 |
|---|---|---|---|---|---|---|---|---|---|---|---|---|---|---|---|---|
| GREEN | 0.04 | 0.06 | 0.10 | 0.13 | 0.16 | 0.20 | 0.25 | 0.32 | 0.40 | 0.45 | 0.50 | 0.56 | 0.63 | 0.71 | 0.79 | 0.89 |
| BLUE | 0.04 | 0.06 | 0.10 | 0.13 | 0.16 | 0.20 | 0.25 | 0.32 | 0.40 | 0.45 | 0.50 | 0.56 | 0.63 | 0.71 | 0.79 | 0.89 |

F I G. 3

(I)

| | YELLOW | RED | MAGENTA | BLUE | CYAN | GREEN | BLACK ← 0 | GRAY | WHITE ← 403F |
|---|---|---|---|---|---|---|---|---|---|

(II)

| | B | R | G | B | R | G | B | R | G | B | R | G | B | R | G | B | R | G |
|---|---|---|---|---|---|---|---|---|---|---|---|---|---|---|---|---|---|---|
| RED | 0.78 | | | 0.66 | | | 0.65 | | | 0.04 | | | 0.04 | | | 0.04 | | | 0.85 |
| GREEN | 0.59 | | | 0.04 | | | 0.04 | | | 0.04 | | | 0.26 | | | 0.22 | | | 0.29 | | | 0.85 |
| BLUE | 0.05 | | | 0.04 | | | 0.23 | | | 0.17 | | | 0.41 | | | 0.05 | | | 0.04 | | | 0.85 |

(III)

| | RED | 3 | 4 | 4 | 16 | 16 | 16 | 16 | 2 |
|---|---|---|---|---|---|---|---|---|---|
| GREEN | 5 | 16 | 16 | 16 | 10 | 11 | 10 | 10 | 2 |
| BLUE | 16 | 16 | 11 | 12 | 8 | 16 | 16 | 10 | 2 |

FIG. 4

| DENSITY LEVEL | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| REFERENCE DENSITY | 0.05 | 0.10 | 0.15 | 0.20 | 0.25 | 0.30 | 0.35 | 0.40 | 0.50 | 0.60 | 0.70 | 0.80 | 0.90 | 1.00 | 1.20 | 1.40 |
| ×0.38 | 0.02 | 0.04 | 0.06 | 0.08 | 0.10 | 0.11 | 0.13 | 0.15 | 0.19 | 0.23 | 0.27 | 0.30 | 0.34 | 0.38 | 0.46 | 0.53 |
| ×0.45 | 0.02 | 0.05 | 0.07 | 0.09 | 0.11 | 0.14 | 0.16 | 0.18 | 0.23 | 0.27 | 0.32 | 0.36 | 0.41 | 0.45 | 0.54 | 0.63 |

|  | YELLOW | RED | MAGENTA | BLUE | CYAN | GREEN |
|---|---|---|---|---|---|---|
| REFERENCE DENSITY | 0.25 | 1.40 | 1.40 | 1.40 | 0.60 | 0.70 |
| ×0.38 | 0.06 | 0.08 | 0.08 | 0.53 | 0.53 | 0.53 |
| PARAMETER | 24 | 6 | 6 | 38 | 89 | 76 |
| ERASE RATIO | 25 | 0 | 0 | 50 | 100 | 75 |

(II)

| PARAMETER | ERASE RATIO |
|---|---|
| 0 ~ 12 | 0 % |
| 13 ~ 37 | 25 % |
| 38 ~ 62 | 50 % |
| 63 ~ 87 | 75 % |
| 88 ~ | 100 % |

(III)

|  | YELLOW | RED | MAGENTA | BLUE | CYAN | GREEN |
|---|---|---|---|---|---|---|
| REFERENCE DENSITY | 1.40 | 1.40 | 0.70 | 0.80 | 0.40 | 1.40 |
| ×0.45 | 0.11 | 0.63 | 0.63 | 0.63 | 0.27 | 0.32 |
| PARAMETER | 8 | 45 | 90 | 79 | 68 | 23 |
| ERASE RATIO | 0 | 50 | 100 | 75 | 75 | 25 |

FIG. 6

|  | 0 % | 25 % | 50 % | 75 % | 100 % |
|---|---|---|---|---|---|
| LATENT IMAGE IN MAGENTA | 250µ × 250µ | | | | |
| LATENT IMAGE IN YELLOW | | | | | |

FIG. 7

| R \ G | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| 16 | 38 | 45 | 52 | 58 | 66 | 76 | 90 | 100 | 100 | 100 | 100 | 100 | 100 | 100 | 100 | 100 |
| 15 | 32 | 38 | 44 | 49 | 56 | 64 | 76 | 93 | 100 | 100 | 100 | 100 | 100 | 100 | 100 | 100 |
| 14 | 28 | 33 | 38 | 42 | 48 | 56 | 66 | 80 | 95 | 100 | 100 | 100 | 100 | 100 | 100 | 100 |
| 13 | 25 | 29 | 34 | 38 | 43 | 50 | 59 | 72 | 85 | 98 | 100 | 100 | 100 | 100 | 100 | 100 |
| 12 | 22 | 26 | 30 | 34 | 38 | 44 | 52 | 63 | 75 | 86 | 100 | 100 | 100 | 100 | 100 | 100 |
| 11 | 19 | 22 | 26 | 29 | 33 | 38 | 45 | 55 | 65 | 75 | 88 | 100 | 100 | 100 | 100 | 100 |
| 10 | 16 | 19 | 22 | 25 | 28 | 32 | 38 | 46 | 55 | 63 | 75 | 91 | 100 | 100 | 100 | 100 |
| 9 | 13 | 16 | 18 | 20 | 23 | 26 | 31 | 38 | 45 | 52 | 61 | 74 | 95 | 100 | 100 | 100 |
| 8 | 11 | 13 | 15 | 17 | 19 | 22 | 26 | 32 | 38 | 44 | 52 | 63 | 80 | 100 | 100 | 100 |
| 7 | 10 | 11 | 13 | 15 | 17 | 19 | 23 | 28 | 33 | 38 | 45 | 55 | 70 | 96 | 100 | 100 |
| 6 | 8 | 10 | 11 | 13 | 14 | 16 | 19 | 24 | 28 | 32 | 38 | 46 | 59 | 82 | 100 | 100 |
| 5 | 7 | 8 | 9 | 10 | 12 | 13 | 16 | 19 | 23 | 26 | 31 | 38 | 49 | 67 | 100 | 100 |
| 4 | 5 | 6 | 7 | 8 | 9 | 11 | 12 | 15 | 18 | 21 | 24 | 30 | 38 | 53 | 86 | 100 |
| 3 | 4 | 5 | 5 | 6 | 7 | 8 | 9 | 11 | 13 | 15 | 18 | 21 | 27 | 38 | 62 | 100 |
| 2 | 2 | 3 | 3 | 4 | 4 | 5 | 6 | 7 | 8 | 9 | 11 | 13 | 17 | 23 | 38 | 100 |
| 1 | 1 | 1 | 1 | 1 | 2 | 2 | 3 | 3 | 3 | 3 | 4 | 5 | 6 | 9 | 14 | 38 |

COLOR ELECTROPHOTOGRAPHIC COPYING PROCESS

BACKGROUND OF THE INVENTION

The present invention relates to a color electrophotographic copying process for producing colored copies.

Color electrophotographic copying systems utilizing the Carlson process are well known in the art. The typical duplicating process in such color electrophotographic copying systems is described below.

A uniformly charged photosensitive body having photoconductivity is exposed to a light image of a colored original through a red filter. The exposure of a photosensitive body to a colored original through a filter will be referred to as "color-separated exposure". An electrostatic latent image formed as a result of color-separated exposure will be referred to as a "color-separated latent image". The color-separated latent image formed by the color-separated exposure is then developed by a toner (hereinafter called a "cyan toner") colored in cyan which is complementary to the color of the filter, i.e., red, that was used in achieving the color-separated exposure. The developed visible image in cyan is then transferred to a white recording sheet as of paper.

The photosensitive body is thereafter subject to color-separated exposure using a green filter, and the resultant color-separated latent image is developed by a magenta toner colored in magenta which is complementary to green. The developed visible image in magenta is also transferred to the recording sheet.

Then, the photosensitive body is subject to color-separated exposure using a blue filter, and the resultant color-separated latent image is developed by a yellow toner. The developed visible image in yellow is also transferred to the recording sheet.

Consequently, the visible imates in cyan, magenta, and yellow are successively transferred to the recording sheet in an overlapping manner to thereby reproduce a colored image of the colored original.

The term "blue" used in the specification is employed to actually mean a hue called "bluish purple".

The individual color-separated latent images obtained by color-separated exposure will be identified by the colors of the toners with which the latent images are to be developed. For example, the cyan latent image means the color-separated latent image to be developed by the cyan toner, and is formed by the color-separated exposure using the red filter. Likewise, the magenta and yellow latent images are the color-separated latent images are formed by the color-separated exposure using the green and blue filters, respectively.

In the aforesaid color electrophotographic copying system, the color of a colored copy image is dependent on the combination of toner colors on a recording sheet. Therefore, the tone of the colored copy image varies if the relative distribution of the quantities of the color toners which constitute the colored copy image is changed.

To stabilize the tone, it has been customary to effect color balancing in the color electrophotographic copying system. Even if the color balancing is carried out ideally, the color of the colored copy image is not an exact duplication of the color of the colored original copied. The reason for this resides in the colors of the toners used.

Now, take the cyan toner for example. Ideal cyan toner is a toner which completely absorbs red light and completely reflects green light and blue light. Any actually available cyan toners, however, does not fully absorb, but slightly reflects, red light, and absorbs green light and blue light partially. Actual magenta and yellow toners are also different ideal magenta and yellow toners, respectively, in the same manner as described above.

An actual cyan toner which absorbs blue and green light partially can be interpreted as containing magenta and yellow toners as impurities. Therefore, a visible image obtained by developing a cyan latent image with an actual cyan toner contains magenta and yellow toners as impurities. When overlapping a visible image in magenta on a visible image in cyan, any magenta toner contained as an impurity in the visible cyan image may be subtracted in advance from the visible magenta image to improve the color reproducibility of the resultant blue image produced as the mixture of the magenta and cyan images.

Such improvement of the color reproducibility of a colored copy image is called "color compensation".

The color compensation is orginally used in the field of color printing. One known process for actually effecting the color compensation is a masking process. It is expected that the masking process can be incorporated in the color electrophotographic copying system for improving the color reproducibility of colored copy images.

Japanese Laid-Open Patent Publication No. 53(1978)-3232 discloses such a masking process as incorporated in a color electrophotographic copying system. To implement the disclosed process, however, a pair of photosensitive bodies having photoconductivity is required and the resultant copying apparatus is large in size.

As well known in the art, it is difficult for an electrophotographic copying system to accomplish proper gradation reproducibility. This results from the fact that the gradation reproducibility curve is not linear on a graph having an original image density on the horizontal axis and a copied image density on the vertical axis.

Since the gradation cannot accurately be reproduced, the tone of a colored copy image in a color electrophotographic copying system is liable to differ from that of the original colored image.

SUMMARY OF THE INVENTION

It is an object of the present invention to provide a color electrophotographic copying process capable of effecting proper color compensation with a masking process without making the copying apparatus used large in size.

Another object of the present invention is to provide a color electrophotographic copying process which can perform appropriate gradation compensation.

For appropriate color compensation, a color electrophotographic copying process includes the steps of reading an original, determining a masking amount, and partially erasing latent images with an eraser. In the reading step, a colored original is color-separated and read by a solid-state image pickup device. In the color separation, a light image of the colored original is passed through color separation filters and focused on the photodetector area of the solid-state image pickup device. The original may be read by color separation filters and three solid-state image pickup devices, or a single-layer solid-state image pickup device.

The reading step may be effected simultaneously with initial color-separated exposure of a photosensitive body, i.e., exposure of the photosensitive body to form a cyan latent image, or prior to exposure of the photosensitive body.

In the step of determining the masking amount, the amount of masking is determined on the basis of image information read in the original reading step.

The masking amount determining step is processed primarily by a microcomputer. The masking amount may be computed by a predetermined arithmetic operation, or may be selected from computed and stored masking amounts.

The partial erasing step partially erase the latent images at erase ratios determined dependent on the masking amount determined in the masking amount determining step. The partial erasing is performed in an areamodulating manner by the eraser.

The eraser comrises a light-emitting dot array which is a combination of an LED array, a dot fluorescent lamp array, or the like and a focusing optical system. The focusing optical system is composed of a convergent light transmitting array or a roof mirror lens array.

The masking amount and the manner of determining the same will briefly be described below.

It is now assumed that the colors of filters used for color separation are expressed by $\alpha$, $\beta$, and $\gamma$, and their complementary colors are expressed by $\epsilon$, $\eta$, and $\zeta$. In other words, when the filter of the color $\alpha$, for example, is used for color separation, a $\epsilon$ latent image is formed.

If the $\epsilon$ latent image is developed by a $\epsilon$ toner, then a $\eta$ toner and a $\zeta$ toner are included as impurities.

When a $\eta$ latent image is to be developed with the actual $\eta$ toner, the amount of the $\eta$ toner attached to the $\eta$ latent image is relatively reduced in view of the $\eta$ toner attached as the impurity in the previous development using the $\epsilon$ toner. The reduction of the amount of the $\eta$ toner is determined by multiplying the amount of the $\epsilon$ latent image by a coefficient A which is smaller than 1.

Then, a $\zeta$ latent image is developed by the $\zeta$ toner. Since the $\zeta$ toner has already been contained as an impurity in the previous development using the $\epsilon$ toner and the $\eta$ toner, the amount of the $\zeta$ toner to be attached is reduced by a value obtained by multiplying the $\eta$ latent image by a coefficient B smaller than 1.

The coefficients A, B are referred to as masking ratios. The masking ratios A, B are determined when the colors $\epsilon$, $\eta$, and $\zeta$ are determined, and can be theoretically computed or experimentally determined.

Where the colors $\epsilon$, $\eta$, and $\zeta$ are cyan, magenta, and yellow, respectively, the masking ratio A is generally 0.38 and the masking ratio B is generally 0.45 in color printing.

The products of the $\epsilon$ latent image and the masking ratio A and the $\eta$ latent image and the masking ratio B can be employed as masking amounts. In the following description, the masking amounts are used to mean quantities indicating how much the latent images are to be erased, and are not necessarily expressed as the same amounts at all times.

For example, the masking amounts used when the color reproducibilies for the colors of a colored image are to be uniformly improved, are different from the masking amounts used when the color reproducibility for a particular combination of colors is to be improved.

At any rate, the masking amounts can be theoretically or experimentally determined once how color compensation is to be performed is determined, i.e., whether certain colors or their combinations are to be compensated, or all colors are to be uniformly compensated.

According to the present invention, the colored original is subjected to color separation and is read by the solid-state image pickup device. Where the color of the filter used for such color separation is $\alpha$, the output from the solid-state image pickup device at this time corresponds to the $\epsilon$ latent image. Assuming that this output is referred to as $\epsilon$ output, the product of the $\epsilon$ output and the masking ratio A can be used as the masking amount for the $\eta$ latent image.

In the aforesaid color compensation, the color-separated latent image is partially erased by the eraser in an area-modulating manner. The partial erasing improves the color reprocibility of a colored copy image, but would tend to blur the boundary of the colored copy image.

To prevent the boundary from being blurred, the color electrophotographic copying process should include, in addition to the reading step, the masking amount determining step, and the partial erasing step, the step of detecting a boundary so that the detected boundary will not be partially erased by the eraser.

The detection of a boundary can be effected on the basis of image information obtained in the reading step. More specifically, whether each pixel of the colored original lies in the boundary or not is ascertained.

For gradation compensation, the color electrophotographic copying process includes the steps of reading the original, determining erase ratios, and erasing electrostatic latent images. The electrostatic latent images are formed under prescribed charging conditions and-/or exposing conditions so that they have a relatively insufficient exposure.

The reading step is the same as that previously described. The original may thus be read by color-separation filters and three solid-state image pickup devices, or by a color solid-state image pickup device. When the gradation compensation is to be performed, the reading step is effected prior to first color-separated exposure.

In the erase ratio determining step, digital erase ratios are determined on the basis of image information read in the reading step.

There are a plurality of electrostatic latent images required for producing one colored copy from a colored image. The digital erase ratios are determined respectively for these electrostatic latent images.

In the erase step, the individual electrostatic latent images are digitally erased at the erase ratios determined as above in an area-modulating manner by the eraser in the form of a light-emitting dot array. The digital erasing may be carried out after the photosensitive body has been charged and before it is exposed to the image.

The electrostatic latent images are formed as latent images having a relatively insufficient exposure upon each color-separated exposure after the original has been read out. These latent images of a relatively insufficient exposure are then converted by the digital erasing to electrostatic latent images which are optimum for gradation compensation.

As described above, the electrostatic latent images which are optimum for gradation compensation are obtained by the digital erasing, and a colored electrophotographic copy image is produced from those electrostatic latent images. Therefore, the colored electrophotographic copy image has improved gradation from a low image density region to a high image density region.

A colored original generally has a chromatic image and an achromatic image. The area of the original except the chromatic image is referred to as a neutral image area.

When such a colored original is to be copied in color, it is reasonable to copy the neutral image area with a black toner.

Where the colors used in color separation are red, green, and blue in the color electrophotographic copying process, one colored copy is composed of visible images in cyan, magenta, and yellow and a visible image in black. The colored copy which is appealing in color to the eye is such that the lowest image density of each of the visible images is equal to the background density of the image transfer sheet, the highest image densities of the visible images in black and cyan are 1.4, the highest image density of the visible image in magenta is 1.2, and the highest image density of the visible image in yellow is 1.0.

However, the lowest and highest image densities of the color-separated images of the color image area, and the neutral image area are so different that even when the images are copied faithfully, any colored copy which is appealing in color to the eye cannot be produced.

To avoid this, highest and lowest image densities of the color-separated images of the color image area, and the neutral image area are detected on the basis of the image information read by the solid-state image pickup device prior to the initial color-separated exposure, and the amounts of exposure are adjusted at the time of forming electrostatic latent images corresponding to visible images required to produce one colored copy so that the lowest image densities will be of a prescribed value. Then, the electrostatic latent images are digitally erased as required in an area-modulating manner to correct the electrostatic latent images so that the highest image densities of the visible images will be of a prescribed value. This process produces a colored copy which is appealing in color to the eye.

The digital erasing may be performed after the photosensitive body has been charged and before it is exposed to the image. That is, the areas of the electrostatic latent images which are to be erased can be erased before the latent images are formed.

Where the chromatic image area is to be copied with a color toner and the neutral image area is to be copied with a black toner, density distribution patterns in the color-separated images of the chromatic image area, and the neutral image area are detected on the basis of the data that are read by the solid-state image pickup device prior to the initial color-separated exposure, and gradation reproduction curves respectively for the visible images required to produce one colored copy are selected dependent on the density distribution patterns which are detected, so that gradation reproducibility can effectively be improved.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2 through 5 are tables explanating the determination of an erase ratio for partial image erase for color compensation;

FIG. 6 is a diagram illustrative of partial erase of color-separated latent images;

FIG. 7 is a table of erase ratios;

DESCRIPTION OF THE PREFERRED EMBODIMENTS

Figure 1:
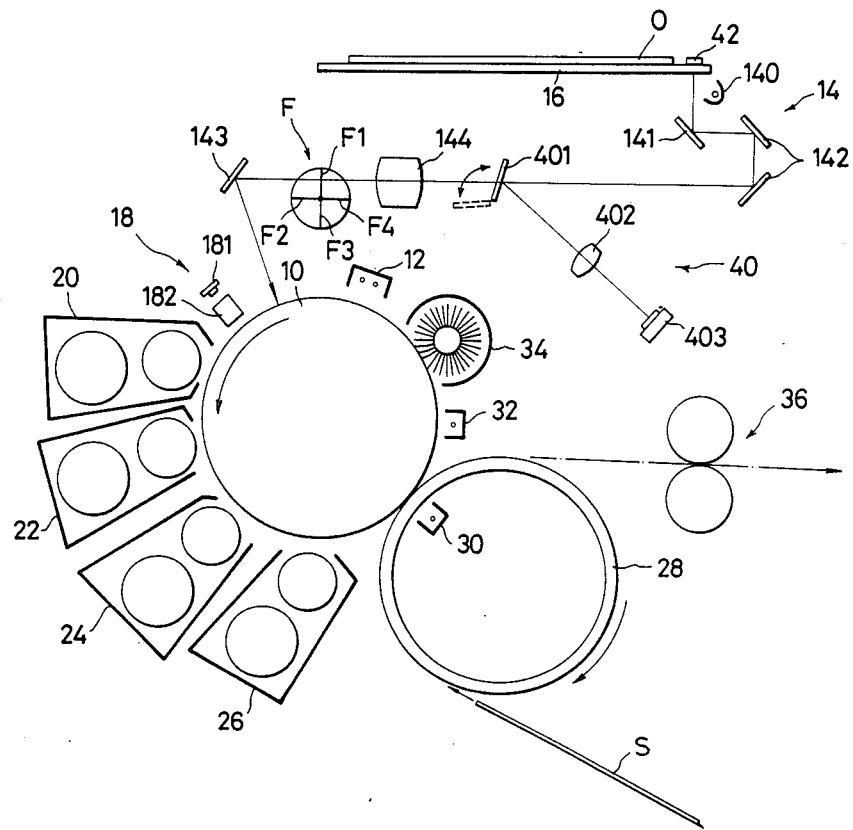
FIG. 1 is a schematic side elevational view of essential components of a color electrophotographic copying apparatus for carrying out a color electrophotographic copying process of the present invention.

FIG. 1 schematically illustrates a color electrophotographic copying apparatus which carries out a color electrophotographic copying process according to the present invention. It is to be noted that the relative dimensions of the illustrated parts do not neccessarily reflect the actual dimensional accuracies.

A drum-shaped photosensitive body 10 having photoconductivity is rotatable about its own axis in the direction of the arrow. The photosensitive drum 10 supports a photoconductive layer made of a material such as $As_2Se_3$ having a panchromatic spectral sensitivity.

Around the photoconductive drum 10, there are arranged a charger 12, an eraser 18, developing devices 20, 22, 24, 26, a holder 28, an eraser 32, and a cleaner 34.

An original O to be copied is placed flatwise on an original support glass plate 16.

An exposure optical system 14 is composed of a lamp 140, a plane mirror 141, roof mirrors 142, a plane mirror 143, a lens 144, and a filter device F.

A readout optical system 40 comprises a mirror 401, a lens 402, and a single-layer color solid-state image pickup device 403. The mirror 401 is angularly movable selectively between a solid-line position and a dotted-line position. The mirror 401 may be replaced with a fixed half-silvered mirror.

A reference density plate 42 is disposed at the right-hand end (as shown in FIG. 1) of the original support glass plate 16.

The color electrophotographic copying apparatus also includes an image transfer device 30 and an image fixing device 36. Denoted at S is an image transfer sheet of plain paper serving as a recording sheet.

When the original O on the glass plate 16 is to be irradiated and scanned, the lamp 140 is energized and moved to the left in unison with the plane mirror 141. At the same time, the roof mirrors 142 are moved to the left at a speed which is half the speed of travel of the plane mirror 141. If the mirror 401 of the readout optical system is in the dotted-line position, then an image of the illuminated portion of the original O is focused by the lens 144 on the photosensitive drum 10.

If the mirror 401 is in the solid-line position, then the image of the illuminated portion of the original O is focused by the lens 402 on the color solid-state image pickup device 403. Where the half-silvered mirror is used in place of the mirror 401, the image of the illuminated portion of the original O is focused simultaneously on both the photosensitive drum 10 and the color solid-state image pickup device 403.

The filter device F has a red filter F1, a green filter F2, a blue filter F3, and a neutral density filter F4 (hereinafter referred to as an "ND filter F4). These filters can selectively be placed in the optical path of the exposure optical system 14.

The eraser 18 is composed of an LED (light-emitting diodes) array 181 and a convergent light transmitting array 182.

The holder 28 is in the form of a drum for holding the image transfer sheet S to allow a visible image to be transferred to the image transfer sheet S. The holder 28 is rotatable about its own axis in the direction of the arrow in response to rotation of the photosensitive drum 10.

The color solid-state image pickup device 403 comprises an array of minute photodetector elements arranged in a direction normal to the sheet of FIG. 1. Each of the photodetector elements corresponds to an image element having a size of of $(125/3)$ $\mu m \times (125/3)$ $\mu m$ on the original O. Therefore, one photodetector element can convert the corresponding image element on the original O into a signal. The photodetector elements are covered with minute filters, respectively, which are red, green, and blue filters that are cyclically arranged in the order named. Any three adjacent photodetector elements are covered with red, green, and blue filters, respectively.

Such three adjacent photodetector elements cover one pixel on the original O, i.e., an area of 125 $\mu m \times$ 125 $\mu m$. Therefore, by reading the original O while illuminating and scanning the original O, each pixel on the original O can be separated into the colors of red, green, and blue and read out.

Assuming in FIG. 1 that the original O has a dimension l1 in the direction parallel to the sheet of FIG. 1 and a dimension l2 in the direction normal to the sheet of FIG. 1, the orignal O can be divided into a matrix having M rows and N columns of pixels: M=l1/125 $\mu m$, N=l1/125 $\mu m$. The pixel positioned on the mth row and the nth column in the pixel matrix will be referred to as a "matrix (m, n).

The LED array 181 of the eraser 18 comprises an array of minute light-emitting diodes each having a light-emitting area of a size 125 $\mu m \times$ 125 $\mu m$, the LED array extending in the direction normal to the sheet of FIG. 1. These light-emitting diodes or LEDs can be energized in any desired combination.

When one of the LEDs is energized, the image of the energized LED is focused by the convergent light transmitting array 182 onto the photosensitive drum 10 at a magnification of 1. Therefore, an electrostatic latent image on the photosensitive drum 10 can be erased in the size of pixels by the eraser 18. The pixels read by the readout optical system 40 correspond respectively to the pixels on the eraser 18.

The color copying process carried out by the color electrophotographic copying machine will be described below. The color copying process which follows contains no color compensation and gradation compensation according to the present invention.

After the colored original O to be copied has been placed on the glass plate 16, the copying apparatus is energized to set the mirror 401 of the readout optical system 40 in the solid-line position, illuminate and scan the original O, and enable the color solid-state image pickup device 403 to separate each pixel of the colored original O into the three primaries of red, green, and blue for conversion of them into signals.

Prior to reading out the original O, the image of the reference density plate 42 is radiated onto the color solid-stated image pickup device 403 which reads the information contained in the reference density plate 42. The reference density plate 42 comprises a gray scale of 16 densities as defined in the following table 1:

TABLE 1

| Density level | 1 | 2 | 3 | 4 | 5 | 6 | 7 | 8 |
|---|---|---|---|---|---|---|---|---|
| Density | 0.05 | 0.10 | 0.15 | 0.20 | 0.25 | 0.30 | 0.35 | 0.40 |
| Density level | 9 | 10 | 11 | 12 | 13 | 14 | 15 | 16 |
| Density | 0.50 | 0.60 | 0.70 | 0.80 | 0.90 | 1.00 | 1.20 | 1.40 |

The density levels 1 through 16 are identification indicia allotted to the corresponding densities. The density level 1 corresponds to white and the density level 16 corresponds to black.

The signals indicative of the densities of the reference density plate 42 are supplied to a microcomputer (not shown).

Then the original O is read out. The original O has chromatic images and achromatic images on a white background. The areas of the original O which bear the chromatic images will be referred to as a "color image area", whereas the areas bearing the achromatic images will be referred to as a "neutral image area".

The signals indicative of each pixel of the original O as read out include three signals representing the colors of red, green, and blue obtained through color separation. It is assumed that the signals indicative of red, green, and blue on the pixel (m, n) are indicated by R(m, n), G(m, n), and B(m, n), respectively.

The signals R(m, n), G(m, n), and B(m, n) derived from the original O are fed to the microcomputer in which they are compared with the information of the reference density plate 42 and converted to any of the density levels 1 through 16. The signal R(m, n) is converted to the density level $L_R(m, n)$, the signal G(m, n) to the density level $L_G(m, n)$, and the signal B(m, n) to the density level $L_B(m, n)$.

Then, the microcomputer ascertains whether the image belongs to the color image area or the neutral image area for each pixel.

The achromatic image has the same density level for any of the colors. Therefore, if $L_R(m, n) = L_G(m, n)$ and $L_G(m, n) = L_B(m, n)$, then the pixel (m, n) belongs to the neutral image area, and if not, then the pixel (m, n) belongs to the color image area.

The mirror 401 is then shifted to the dotted-line position, and the photosensitive drum 10 is rotated and uniformly charged by the charger 12.

The original O is thereafter illuminated to expose the photosensitive drum 10. At this time, the red filter F1 of the filter device F is positioned on the exposure optical path. Therefore, an electrostatic latent image formed on the photosensitive drum 10 is a color-separated latent image corresponding to the red image, i.e., a cyan latent image. Where the mirror 401 is replaced with the half-silvered mirror, the readout of the original and color-separated exposure are simultaneously effected.

When the color-separated latent image moves across the iraser 18, the microcomputer energizes those LEDs of the LED array 181 which correspond to the pixels belonging to the neutral image area. The portion of the color-separated latent image which corresponds to the neutral image area is then erased. As a result, the cyan latent image corresponding only to the color image area is left on the photosensitive drum 10.

Thereafter, the electrostatic latent image is developed by the developing device 20 in a magnetic brush developing process, using a cyan toner, i.e., a toner colored in cyan (which is complementary to red). The visible image of cyan is now formed on the photosensitive drum 10 and moves therewith as it rotates.

The image transfer sheet S has its leading end clamped by the holder 28, and is wound around the holder 28 in overlapping relation to the visible image of cyan on the photosensitive drum 10 as the holder 28 is rotated. The image transfer device 30 then charges the holder 28, from the reverse side thereof, with such a polarity which electrically attracts the visible image. The visible image is now transferred under electric forces from the photosensitive drum 10 to the image transfer sheet S. After the visible image has been transferred from the photosensitive drum 10, the remaining charges on the photosensitive drum 10 are erased by the eraser 32, and any residual toner is removed by the cleaner 34.

Then, the green filter F2 of the filter device F is position on the exposure optical path, and the aforesaid process is repeated. The color-separated latent image formed at this time is a magenta image corresponding to the image of the original in green. The latent image portion corresponding to the neutral image area is erased by the eraser 18, and the magenta latent image is then developed by a magenta toner in the developing device 22. The visible image in magenta is thereafter transferred onto the image transfer sheet S in registration with the visible iamge in cyan.

The above process is repeated using the blue filter F3 of the filter device F and the developing device 24 in which a yellow toner is employed.

Finally, the ND filter F4 of the filter device F is placed on the exposure optical path to form an electrostatic latent image which is not subjected to color separation (referred to as a "non-color-separated latent image). The portion of the non-color-separated latent image which corresponds to the color image area is erased by the eraser 18.

The non-color-separated latent image is developed by a black toner in the developing device 26. The visible color in black is then transferred onto the image transfer sheet S, after which the image transfer sheet S is separated from the holder 28 and delivered to the fixing device 36. The toner image is fixed by the fixing device 36 to the image transfer sheet S, which is discharged as a colored copy out of the copying apparatus.

The color copying process which does not involve the principles of the present invention has been described with reference to the copying apparatus illustrated in FIG. 1.

Now, color compensation according to the present invention will be described below. For effecting color compensation in the above color copying process, the latent image corresponding to the color image area should partly be erased by the eraser 18 in an area-modulating manner at an erase ratio dependent on the amount of masking when the neutral image areas of the magent and yellow latent images are to be erased.

Designated in FIG. 2 at 42 is the reference density plate and 403F is the arrangement of the filters of the color solid-state image pickup device 403. The letters R, G, and B indicate red, green, and blue, respectively. The lowermost table in FIG. 2 shows the values of outputs from the color solid-stated image pickup device 403 when the densities of the reference density plate 42 are read out. The numerical values in the row "red" indicate the output values produced when the red filters are used for color separation.

For example, the output of the color solid-state image pickup device 403 for the density 1.4 (density level 16) is 0.04. Although the output values produced when the red, green, and blue filters are used for color separation are not necessarily the same due to spectral characteristics of the color solid-state image pickup device 403, the output values are regarded as the same in the embodiment. Regarding the output values as the same does not impair the general appliability since it is possible to elecrically equalize the output values generated when the different color filters are employed.

As shown in FIG. 3, the original O is assumed to have, on its white background, chromatic images in yellow, red, magenta, blue, cyan, and green, and achromatic images in black and gray. The white background and the achromatic images belong to the neutral image area.

When the original O is read out by the color solid-state image pickup device 403, the output values produced for the respective color-separated images are as shown in FIG. 3 at (II). These outputs are expressed as density levels as shown in FIG. 3 at (III).

The manner in which the amount of masking is determined will be described below. It is assumed as a specific example that masking ratios A and B are 0.38 and 0.45, respectively.

Since there are 16 reference densities in the embodiment, any of color-separated densities of the image on the original is expressed by one of the 16 reference densities.

FIG. 4 shows numerical values obtained by multiplying the 16 reference densities by 0.38 and 0.45.

The numerals in the row "red" given in FIG. 3 at (II) represent the output values of the color solid-state image pickup device when the original O is read with the red filters used.

These output values may be converted to the reference densities according to the relationship of FIG. 3 and the reference densities thus obtained may be multiplied by 0.38 according to FIG. 4. The following table 2 shows the results of such arithmetic operations:

TABLE 2

|  | Yellow | Red | Magenta | Blue | Cyan | Green |
|---|---|---|---|---|---|---|
| Reference density | 0.15 | 0.20 | 0.20 | 1.40 | 1.40 | 1.40 |
| × 0.38 | 0.06 | 0.08 | 0.08 | 0.53 | 0.53 | 0.53 |

The output values obtained by using the green filters may be expressed in reference densities based on the numerical values shown in FIGS. 3 and 2, and such reference densities are illustrated in FIG. 5 at (I). The numerical values just below the reference densities in FIG. 5 at (I) are the same as those in the row "x 0.38" in the above table 2, and indicate the amounts of masking with respect to the magenta latent image.

The percentages of the masking amounts (second row) in FIG. 5 at (I) with respect to the reference densities are given in the third row "parameters" in FIG. 5 at (I) to see how the latent images should be erased dependent on the masking amounts. For example, the yellow image of the original O should be erased for 24%. Since it would be actually difficult to erase the latent images in increments of 1%, the parameters and the erase ratios may be related to each other as shown in FIG. 5 at (II) for erasing the latent images in 5 steps. The erase ratios given in FIG. 5 at (I) are derived according to the relationship of FIG. 5 at (II).

The reference densities of the original obtained by using the blue filter are given in FIG. 5 at (III) in the first row, the reference densities corresponding to the yellow latent image.

The numerals given in the second row in FIG. 5 at (III) are obtained by multiplying the reference densities in the first row in FIG. 5 at (I) for the magenta latent image by 0.45, and represent the amounts of masking for the yellow latent image. The parameters and erase ratios given in FIG. 5 at (III) are computed in the same manner as those in FIG. 5 at (I).

FIG. 6 illustrates the manner in which the latent images are erased according to the erase ratios determined as above. A group of four square pixels is treated as one unit to be erased. When the image is to be erased for 25 %, only one pixel thereof is erased. Each time the erase ratio is increased by 25%, the area to be erased is widened by one pixel. The areas shown unhatched in FIG. 6 are indicative of latent image areas which are not erased.

The aforesaid process will be summarized as follows:

The reference density plate is first read out to determine the relationship between the outputs of the color solid-state image pickup device and the 16 reference densities.

Then, the original is read out. Any one pixel of the original is color-separated into red, green, and blue by three adjacent photodetector elements of the color solid-state image pickup device, and the reference densities in the respective colors can be derived from the outputs of the photodetector elements. Assuming that the reference densities of the pixel in red, green, and blue are X, Y, and Z, respectively, the amount of masking for the magent latent image is 0.38 X and the amount of masking for the yellow latent image is 0.45 Y. The erase ratios for the magenta and yellow latent images are determined by the relationship between the parameters $(0.38X/Y) \times 100$, $(0.45Y/Z) \times 100$ and the erase ratios (FIG. 5 at (II)). With the erase ratio determined for the pixel in question, four pixels including the pixel in question are treated as one unit and erased by energizing a corresponding LED or LEDs of the eraser. Partial erase by the eraser is effected under the control of the microcomputer.

The significance of the reading of the reference density plate 42 will be described.

The output of the color solid-state image pickup device varies dependent on the brightness of the light source, the stains in the optical system, and various other factors. Therefore, it cannot be said that the same density is detected at all times if the color solid-state image pickup device produces the same output when the original is read out. By reading out the reference density plate, the output of the color solid-state image pickup device can properly be related to the reference densities for accurate identification of the color-separated density of the original as read. Inasmuch as the time-dependent changes such as of the brightness of the light source and the stains in the optical system are relatively slow, the reference density plate may be read out periodically or as required though it may be read out each time an original is to be copied.

The process of computing the erase ratio from the output of the color solid-state image pickup device may be carried out by the microcomputer. In the foregoing example, the reference densities are employed to compute the amounts of masking. However, the output of color solid-state image pickup device may be used to compute the masking amount as the output of the image pickup device corresponds to the reference density.

The amounts of masking may be stored in advance since they are determined from the outputs indicative of the color-separated densities as read out.

In FIG. 7, the column "R" indicates density levels when the red filter is used for color separation, and the row "G" indicates density levels when the green filter is used for color separation, the respective numerals corresponding to the numerals given in FIG. 5 at (I) in the third row.

For example, the density level of a blue image on the original is 16 regardless of whether it is color-separated by the red filter or the green filter, and hence the amount of masking can be immediately determined as 38%, so that the area to be erased is found to be 50% from FIG. 5 at (II).

The relationship of FIG. 7 and the amounts of masking derived from the density levels obtained when the green and blue filters are employed for color separation may be stored in the microcomputer, and the required amount of masking may be read out of storage dependent on the reading result.

In the foregoing description, the masking amounts expressed as percentages are converted to the five erase ratios according to the relationship of FIG. 5 at (II). However, six or more erase ratios may be employed. For example, the following table 3 shows 16 erase ratios:

TABLE 3

| Masking amount | 0–6 | 7–12 | 13–18 | 19–24 |
|---|---|---|---|---|
| Erase value | 1 | 2 | 3 | 4 |
| Masking amount | 25–30 | 31–36 | 37–42 | 43–48 |
| Erase value | 5 | 6 | 7 | 8 |
| Masking amount | 49–54 | 55–60 | 61–66 | 67–72 |
| Erase value | 9 | 10 | 11 | 12 |
| Masking amount | 73–78 | 79–84 | 85–90 | 91–100 |
| Erase value | 13 | 14 | 15 | 16 |

The process of erasing an area by modulating the same may be effected using a known dithered matrix or submatrix.

Figure 8:
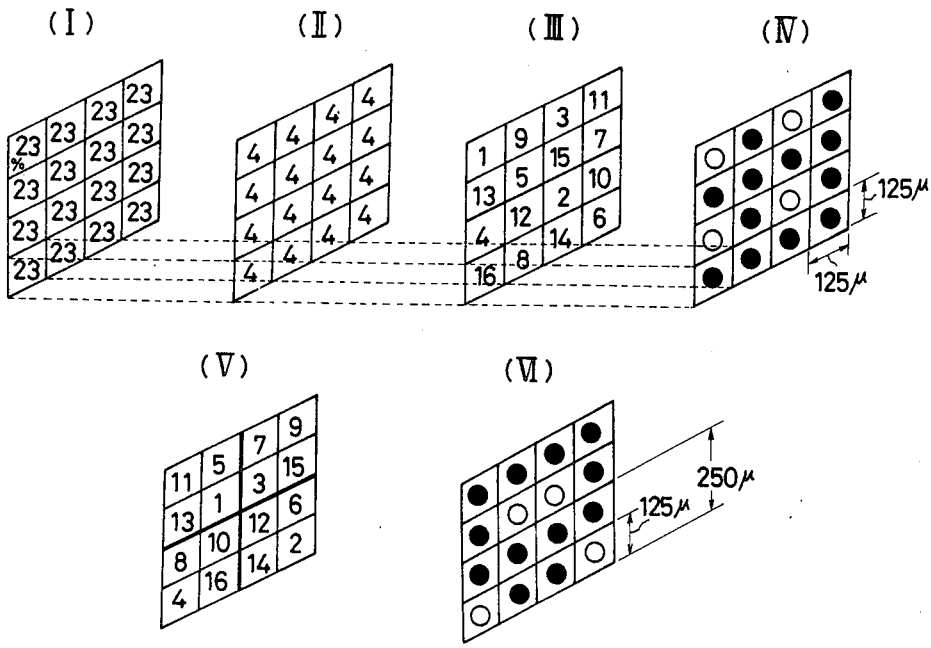
FIG. 8 is a diagrams explanatory of partial erase of color-separated latent images.

FIG. 8 at (III) shows a dithered matrix corresponding to 4×4 pixels. If the amount of masking for the 4×4 pixels is 23%, then the erase value is 4 from the above table 3, which is shown in FIG. 8 at (II). The LEDs are energized where the erase value is equal to or larger than the value of the dithered matrix. The white dots in FIG. 8 at (IV) indicate the pixels where the LEDs are energized.

Figure 9:
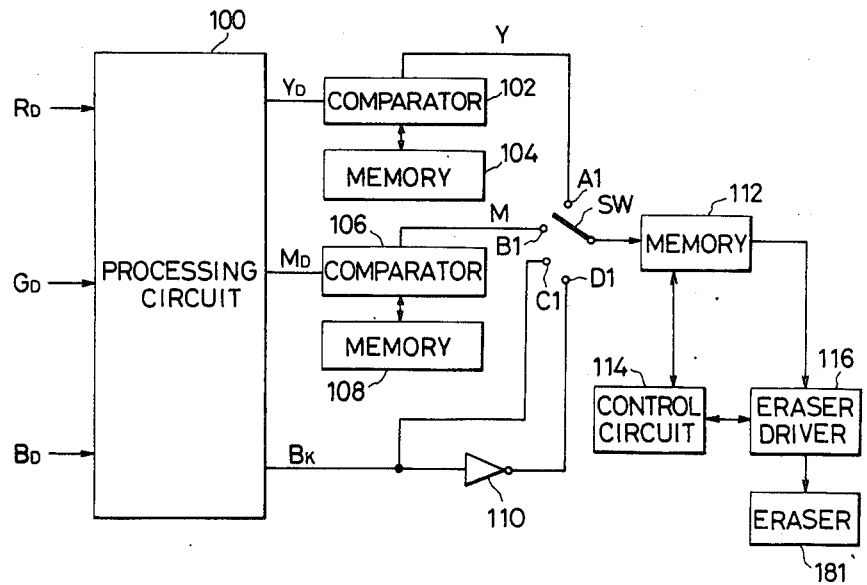
FIG. 9 is a block diagram of a circuit for carrying out color compensation.

FIG. 8 at (V) shows 2×2 submatrixes combined into a 2×2 main matrix. Where the main matrix is used in place of the dithered matrix, the pixels where the LEDs are energized are indicated by white dots as shown in FIG. 9 at (IV).

In the above example, 0.38 and 0.45 are employed as the masking ratios A and B, respectively, for deriving the masking amount. The masking amount is a quantity set up as a standard for determining the erase ratio as described above, and may be determined in various ways. Methods of determining the amount of masking without using the masking ratio will be described below.

TABLE 4

| 0.05 | 0.10 | 0.15 | 0.20 | 0.25 | 0.30 | 0.35 | 0.40 | 0.50 | 0.60 | 0.70 | 0.80 | 0.90 | 1.00 | 1.20 | 1.40 |
|---|---|---|---|---|---|---|---|---|---|---|---|---|---|---|---|
| 85 | 75 | 68 | 60 | 53 | 49 | 43 | 38 | 31 | 24 | 19 | 15 | 12 | 10 | 6 | 4 |
| 1 | 2 | 3 | 4 | 5 | 6 | 7 | 8 | 9 | 10 | 11 | 12 | 13 | 14 | 15 | 16 |

In the above table 4, the first or uppermost row indicates reference densities, and the second row indicates relative values, expressed in percentages, of the output voltage of the color solid-state image pickup device, which correspond to the reference densities. The conversion levels at which the relative voltage values are converted from analog to digital values are in the range of from 1 to 16 as indicated in the third or lowermost row.

TABLE 5

|   | Yellow | Magenta | Cyan | Blue | Green | Red | Violet |
|---|---|---|---|---|---|---|---|
| R | 2 | 2 | 13 | 13 | 13 | 2 | 12 |
| G | 3 | 13 | 9 | 14 | 10 | 14 | 15 |
| B | 15 | 11 | 4 | 9 | 15 | 16 | 12 |

The table 5 shows the A/D conversion levels for converting the output of the image pickup device when the color image area of the original is color-separated by the red (R), green (G), and blue (B) filters and read out.

TABLE 6

| Yellow | Magenta | Cyan | Blue | Green | Red | Violet |
|---|---|---|---|---|---|---|
| 3 | 13 | 9 | 14 | 10 | 14 | 15 |
| −2 | −2 | 9 | 9 | 9 | −2 | 8 |
| 5 | 15 | 0 | 5 | 1 | 16 | 7 |
| 75 | 0 | 100 | 75 | 100 | 0 | 50 |

In the table 6, the numerals in the first row, 3, 13, 9, 14, 10, 14, and 15 are equal to the those in the row "G" in the table 5 and correspond to the magenta latent image. Now, take the color of cyan for example. It has a high density of 9 when color-separated by the green filter. Therefore, when developed with the magenta toner, the color of cyan is impured by a color mixture. To prevent this, a constant is subtracted from the numerals in the row "R" in the table 4 so that the density of cyan will be equal to the density of cyan in the first row of the table 5 corresponding to the magenta latent image. Such a constant is found to be 4.

The second row of the table 6 indicates numerals obtained by subtracting 4 from the numerals in the first row "R" of the table 5 and gives the amounts of masking.

The third row of the table 6 shows numerals obtained by subtracting the numerals in the second row form those in the first row, and such numerals are parameters for giving erase ratios.

TABLE 7

| Parameter | 2 or below | 3–5 | 6–9 | 10–18 | 14 or more |
|---|---|---|---|---|---|
| Erase ratio | 100% | 75% | 50% | 25% | 0 |

The relationship between the parameters and erase ratios is given in the table 7. The lowermost row in the table 7 gives the erase ratios.

The numerical values obtained when the blue filter is used for color separation are indicated in the following table 8:

TABLE 8

| Yellow | Magenta | Cyan | Blue | Green | Red | Violet |
|---|---|---|---|---|---|---|
| 15 | 11 | 4 | 9 | 15 | 16 | 12 |
| 1 | 11 | 7 | 12 | 8 | 12 | 13 |
| 14 | 0 | −3 | −3 | 7 | 4 | −1 |
| 0 | 100 | 100 | 100 | 50 | 75 | 100 |

Since the density of magenta is high, the color of the visible image in magenta is impured when developed with the yellow toner. Thus, the value (in second row in the table 8) obtained by subtracting 2 from the color-separated density (in the row "G" in the table 5) produced by using the green filter is employed as the masking amount, and converted to a parameter (in the third row in the table 8), from which the erase ratio is derived as indicated in the lowermost row in the table 8 based on the table 7.

Color compensation based on the tables 6 and 8 allows improved reproducibility of cyan and magenta, but results in insufficient reproducibility of red, for example. For improving reproducibility of the color of red, the magenta latent image may be erased at the proportions of yellow; 50%, magenta; 0%, cyan; 75%, blue; 50%, green; 75%, reg; 0%, and violet; 25%, for example, and the yellow latent image may be erased at the proportions of yellow; 0%, magenta; 75%, cyan and blud; 100%, green; 25%, red; 50%, and violet; 100%.

FIG. 9 shows in block form a circuit arrangement for carrying out the process of the present invention.

When the original O is read out by the color solid-state image pickup device 403 (FIG. 1), the output from the image pickup device 403 is divided into signals for the respective colors, which are applied as color digital signals $R_D$, $G_D$, and $B_D$ to a processing circuit 100. The signals $R_D$, $G_D$, and $B_D$ are signals color-separated by red, green, and blue, respectively.

At the same time that the original O is read out, the photosensitive drum 10 is exposed to the image of the original and forms a cyan latent image thereon.

A switch SW is first connected to a terminal Cl. The processing circuit 100 produces a binary signal $B_K$ indicative of whether a pixel is in a neutral image area or a color image area. The binary signal $B_K$ is 1 when the pixel is in the neutral image area, and 0 when the pixel is in the color image area. The signal $B_K$ is stored in a memory 112, and brought into positional alignment with the cyan latent image by a control circuit 114. The signal $B_K$ is then applied to an eraser driver 116 for controlling the energization of the eraser 181. The latent image portion corresponding to the neutral area, i.e., the neutral latent iamge is now erased from the cyan latent image.

When a magenta latent image is formed, the switch SW is connected to a terminal Bl. At this time, the processing circuit 100 generates a multi-valued signal $M_D$ containing information on the masking amount. The multivalued signal $M_D$ is applied to a comparator 106 which compares the signal $M_D$ with the information stored in a memory 108 and produces a binary signal M indicating whether the pixel is to be erased or not. The signal M is 1 for the neutral area, 1 for erasing, and 0 for other conditions. In response to the signal M, the neutral latent image is erased from the magenta latent image, and the color compensation erasing is effected on the magenta latent image.

When a yellow latent image is formed, the switch SW is connected to a terminal A1. The processing circuit 100 issues a multi-valued signal $Y_D$ containing information on the masking amount to a comparator 102. The comparator 102 compares the multi-valued signal $Y_D$ with the information stored in a memory 104, and generates a signal Y which is 1 for the neutral area and erasing, and 0 for other conditions.

The neutral latent image is erased from the yellow latent image, and the color compensation erasing is effected on the yellow latent image.

Finally, when an electrostatic latent image for a non-color-separated color image is formed, the switch SW is connected to a terminal D1.

The binary signal $B_K$ produced by the processing circuit 100 is inverted by an inverter 110 and fed to the memory 112. Consequently, the latent image area corresponding to the color image is erased from the electrostatic latent image.

The color reproducibility in the color electrophotographic images is improved by the color compensation described above. However, the boundaries of color electrophotographic iamges are blurred due to the area-modulating erase effected for the color compensation.

To keep image boundaries from being blurred, the electrophotographic copying process should include the step of detecting an image boundary to prevent partial area-modulating erase on the detected boundary. The boundary can be detected by ascertaining whether a certain pixel belongs to the boundary or not.

For boundary detection, the density levels $L_R(m, n)$, $L_G(M, n)$, and $L_B(m, n)$ are employed which are obtained in color separation of the pixel (m, n) in the pixel matrix.

In the apparatus shown in FIG. 1, the area corresponding to the neutral image is developed by a black toner, and hence the neutral image area is not required to be subjected to color compensation.

Generally, an abrupt change occurs in either of $L_R(m, n)$, $L_G(M, n)$, and $L_B(m, n)$ at a boundary. Therefore, the following discrimination is performed in the color image area: The pixel (m, n) at the mth row and nth column in the M×N pixel matrix, and an adjacent pixel (m, n+1) are now considered, and $$L_R(m, n+1) - L_R(m, n) \geq 8$$

$$L_G(m, n+1) - L_G(m, n) \geq 8$$

$$L_B(m, n+1) - L_B(m, n) \geq 8$$

ps are checked. If one or more of the above three relationships are met, then the pixel (m, n+1) is determined as being located in a boundary.

If one or more of the following three relationships is met:

$$L_R(m, n+1) - L_R(m, n) \leq -8$$

$$L_G(m, n+1) - L_G(m, n) \leq -8$$

$$L_B(m, n+1) - L_B(m, n) \leq -8 \text{ then the pixel (m, n) is judged as being in a boundary.}$$

If the pixel (m, n+1) is in a neutral image area and the pixel (m, n) is not, then the pixel (m, n) is located in a boundary. Likewise, if the pixel (m, n) is in a neutral image area and the pixel (m, n+1) is not, then the pixel (m, n+1) is located in a boundary.

The boundary is detected in the aforesaid manner. The bondary detection is performed by the microcomputer.

Figure 10:
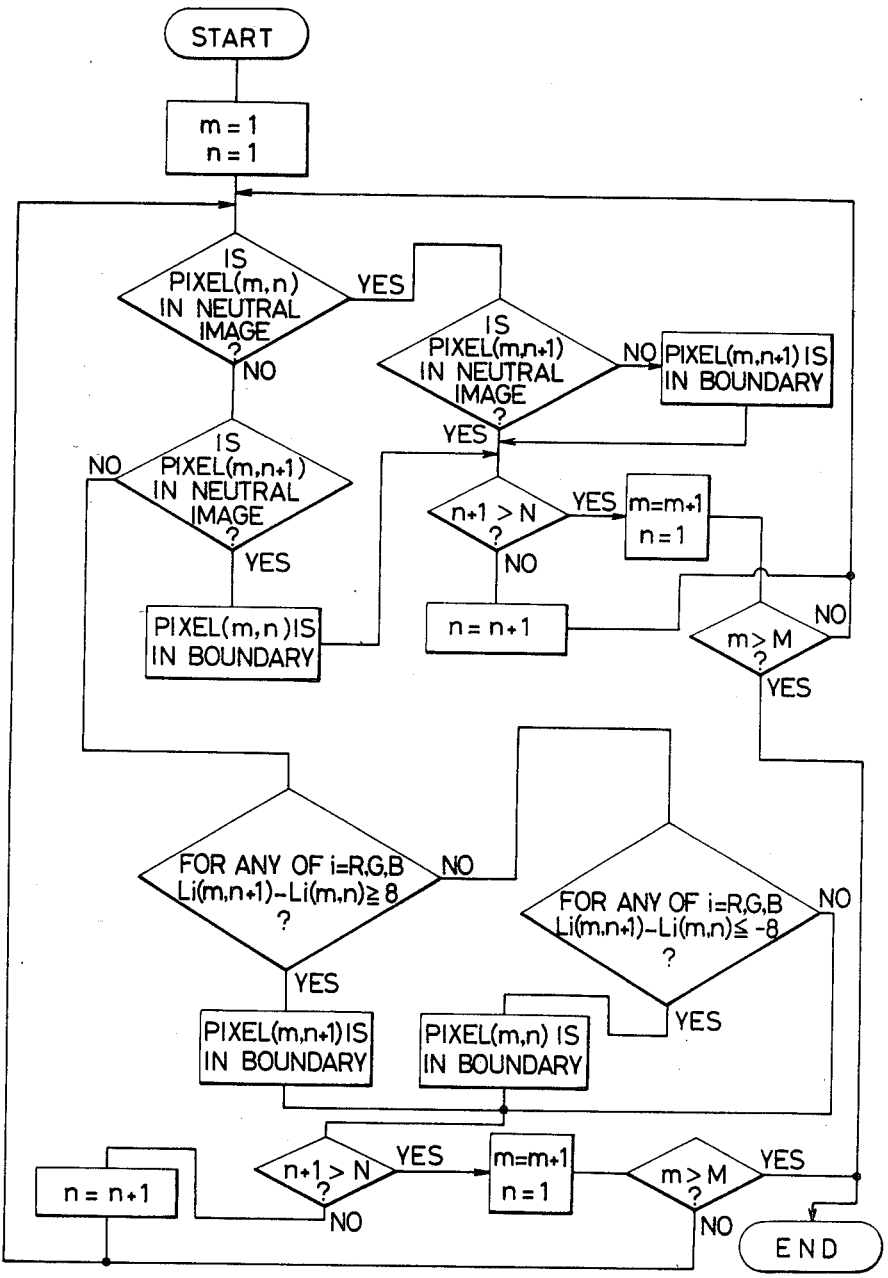
FIG. 10 is a flowchart of a process for detecting a boundary.

FIG. 10 shows a flowchart of operation for the boundary detection. The pixel in the detected boundary is stored in a memory. When a command to erase the pixel (m, n) is issued in the partial erase step as described above, the pixel (m, n) and the information on the boundary stored in the memory are compared to ascertain whether the pixel (m, n) is in the boundary or not. If the pixel (m, n) is in the boundary, then the partial erase is not effected. Therefore, the partial erase is carried out by the eraser except for the boundary.

Briefly summarized, the color reproducibility is improved by effecting the masking through the area-modulating partial erase, but the partial erase on the boundary results in blurring of a colored copy image. To avoid this, no partial erase is performed in the boundary to clearly show the boundary in the colored copy image.

Instead of the incomplete erasing of a boundary, the boundary may be erased at a lower erase ratio than that of the other areas. Dependent on the toner color, a latent image such for example as a yellow latent image may be erased up to the boundary.

Compensation of gradation will be described hereinbelow.

For gradation compensation, a plurality of electrostatic latent images required to produce a single colored copy are individually digitally erased in an area-modulating manner at erase ratios based on the image information.

In the electrophotographic copying process described with reference to FIG. 1, there are four electrostatic latent images required to produce one colored copy, and these electrostatic latent images are produced by removing a neutral latent image area from each of the color-separated latent images and also by removing a color latent image area from the non-color-separated latent image.

Figure 11:
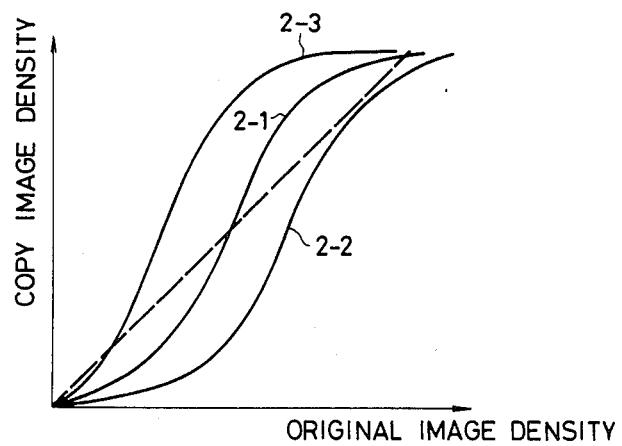
FIGS. 11 through 14 are diagrams explanatory of a process of gradation compensation.

A gradation reproduction curve is generally S-shaped as indicated by 2-1 in FIG. 11. The gradation reproduction curve 2-1 indicates that the gradation reproducibility is poor in a low image density area (so-called lightlight area) of the original and also in a high image density area (so-called shadow area).

When exposure is relatively insufficient in the formation of an electrostatic latent image, the gradation reproduction curve is indicated by 2-3 in FIG. 11. The gradation reproduction curve 2-3 shows that the gradation reproducibility is good in the highlight area. Conversely, when exposure is relatively excessive, the gradation reproduction curve is indicated by 2-2 and exhibits good gradation reproduciblity in the shadow area.

The relatively insufficient or excessive exposure will briefly be explained. The properties of an electrostatic latent image are determined by charging and exposure. When the photosensitive drum is highly charged, the gradation reproduction curve is indicated by 2-3 even if the amount of exposure is normal. Even if the amount of exposure is small, the gradation reproduction curve is indicated by 2-2 by reducing the extent to which the photosensitive drum is charged. Therefore, the conditions in which the gradation reproduction curve 2-3 is given are called a relatively insufficient exposure.

The gradation reproduction curve is obtained on the basis of the relationship between images. For an electrostatic latent image produced with a relatively insufficient exposure, the density of the image on an original and the latent image potential are related to each other as indicated at 3-1 in FIG. 12. The gradation reproduction curve 2-3 is obtained by developing this electrostatic latent image.

An ideal gradation reproduction curve is a straight light inclined at 45 degrees as indicated by the broken line in FIG. 11.

Figure 12:
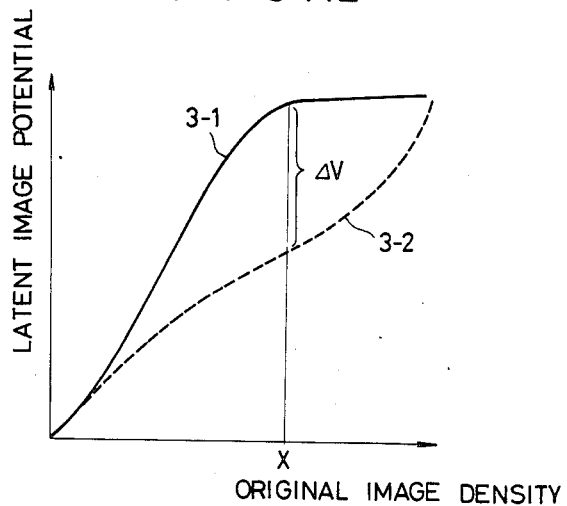

For an ideal electrostatic latent image which gives such an ideal gradation reproduction curve, the relationship between the density of the image on the original and the electrostatic latent image is plotted as indicated by a curve 3-2 in FIG. 12 (the curve is straight as the amount of toner attached in image development is not necessarily proportional to the latent image potential).

At an image density X on the original in FIG. 12, the electrostatic latent image which has a relatively insufficient exposure and the potential of which is indicated by the curve 3-1 can be considered to have its amount of exposure lower than that of the ideal latent image by a potential difference of $\Delta V$.

The principles of gradation compensation according to the present invention are that an electrostatic latent image of a relatively insufficient exposure is formed in advance, and then this electrostatic latent image is digitally erased by the eraser to produce a visible image having good gradation reproducibility from the highlight to shadow areas.

This process of gradation compensation will be described more specifically with reference to the apparatus shown in FIG. 1.

(A) Formation of an electrostatic latent image having a relatively insufficient exposure For forming an electrostatic latent image having a relatively insufficient exposure, the amount of light emitted from the lamp 140 is reduced, or the extent to which the photosensitive drum 10 is charged by the charger 12 is increased, or the extent to which the photosensitive drum 10 is charged by the charger 12 is relatively increased while the amount of light emitted from the lamp 140 is relatively reduced. At any rate, the electrostatic latent image characterized by the curve 3-1 in FIG. 12 should be formed by resorting to one or both of the charging and exposing conditions as described above.

(B) Determination of a digital erase ratio

To obtain an ideal electrostatic latent image (given by the curve 3-2 in FIG. 12), the amounts of exposure to be effected for the respective image densities can be known in advance. The ideal amounts of exposure for the respective image densities are thus determined, and actually selected in reading out the original. The outputs of the color solid-state image pickup device 403 at this time are plotted as indicated by a curve 4-1 in FIG. 13.

Figure 13:
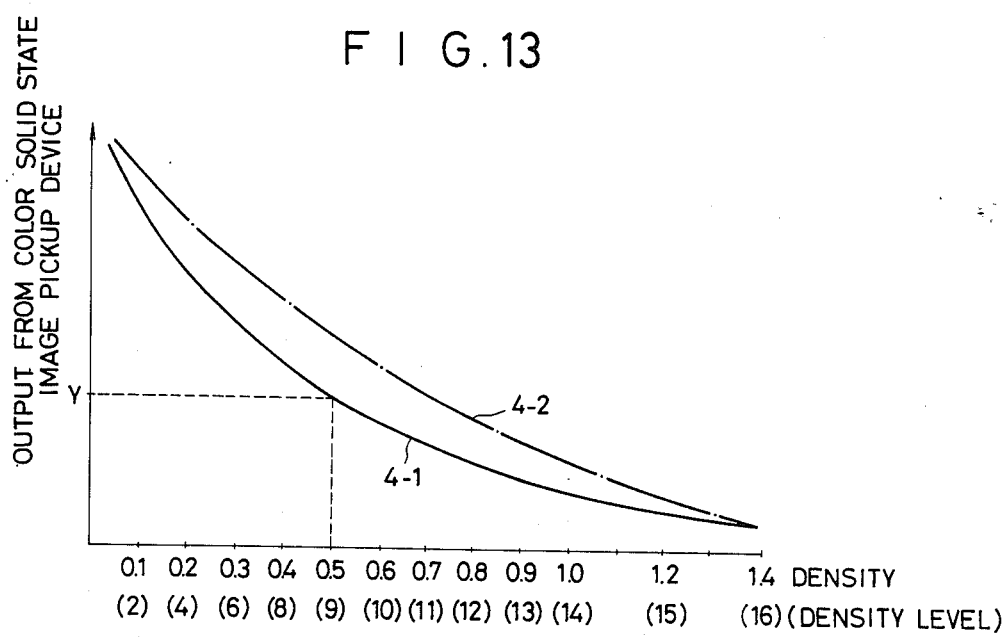

At an original image density of 0.5 (density level of 9) on the curve 4-1 in FIG. 13, if a readout signal Y is produced from the image having the density level 9, then the density of the visual image on the image transfer sheet is also have the density level 9.

The curve 4-1 in FIG. 13 is stored in the microcomputer.

Since the original O is read before the photosensitive drum is exposed, the relationship between the densities of the color image areas of the respective color-separated images and the signal outputs, and also the relationshiop between the neutral image areas and the signal outputs can be determined from the image information as read out.

For example, the densities and the outputs in the color image area of the red image are related to each other as indicated by a curve 4-2 in FIG. 13.

Both of the curves 4-1, 4-2 are expressed by exponential functions. Where the curve 4-1 is expressed by $e^{k1x}$ (x is the density) and the curve 4-2 is expressed by $e^{k2x}$, the erase ratio with respect to the density x is given by $\{1-(e^{k1x}-e^{k2x})\} \times 100$. When this erase ratio is 40% with respect to a density x1, then the latent image area of the image region which corresponds to the density x1 in the color-separated image in red is erased at an area-modulating ratio of 40%. Stated otherwise, if the area of the above latent image area is Z, then the latent image in the area of 0.4Z is erased.

(C) Digital erase

The ditial erasing is effected at the erase ratio thus determined. It is not necessary to carry out the digital erasing in increments of 1%. It is sufficient to effect the digital erasing in increments of about 10% for the purpose of improving the reproducibility of color gradation.

It is now assumed that an erase ratio is determined with respect to a unit of 3×3 pixels, and the digital erasing is effected at erase ratios in increments of 11%.

TABLE 9

| Erase ratio | 0–11 | 12–22 | 23–33 | 34–44 | 45–55 |
|---|---|---|---|---|---|
| Actual erase ratio | 11% | 22% | 33% | 44% | 55% |
| Erase ratio | 56–66 | 67–77 | 78–88 | 89–100 | |
| Actual erase ratio | 66% | 77% | 88% | 100% | |

The erase ratios given in the table 9 are those determined as described above, and the actual erase ratios are those at which the actual erasing is effected by the eraser.

In one matrix of 3×3 pixels, the number of pixles to be erased therein is increased by 1 each time the erase ratio is increased by 11%.

Figure 14:
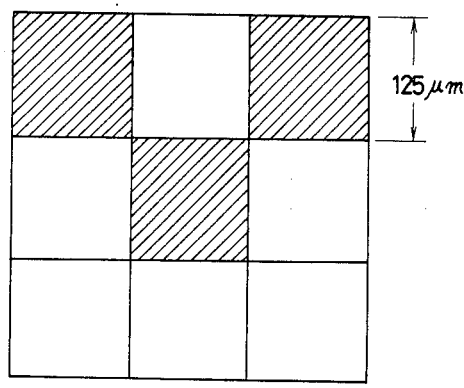

FIG. 14 illustrates the pixel matrix digitally erased at the actual erase ratio of 33%. The three pixels which are shown hatched are erased.

The digital erasing is performed in a plurality of electrostatic latent images required for producing a colored copy image. The détermination of an erase ratio and the erasing are effected under the control of the microcomputer.

In the apparatus shown in FIG. 1, each color-separated latent image is erased by the eraser 18 at its neutral latent image area, and digitally erased by the eraser at its color latent image arear. The non-color-separated latent image is erased at the color latent image area, and digitally erased at the neutral latent image area. With such a process, an electrostatic latent image having a relatively insufficient exposure is formed in advance, and corrected by the digital erasing dependent on the image density. Therefore, the gradation can be improved from the low image density area to the high image density area to improve the color gradation of a colored copy image.

The color gradation of a colored copy image is improved in the above embodiment. From the standpoint of color psychology, a colored copy is pleasing to the eye when the lowest image density of each visible color image is equal to the density of the background of the sheet transfer sheet, and the highest image densities of visible images in black and cyan are 1.4, while the highest image densities of visible images in magenta and yellow are 1.2 and 1.0, respectively. A colored copy image which is pleasing to the eye from the standpoint of color psychology can be achieved by utilizing the digital erasing.

An electrophotographic copying process for producing sightly colored copy images pleasing to the eye will hereinafter be described.

The original is color-separated and read by the solid-state image pickup device prior to the initial color-separated exposure.

Based on the image information as read out, the highest and lowest densities of each of the color-separated images of the color image area and the neutral image area are detected.

For individual visible images required to produce one colored copy, relative amounts of exposure to form electrostatic latent images corresponding to the respective individual visible images are adjusted so that the lowest image densities are of a prescribed value. The formed electrostatic latent images are digitally erased as required in an area-modulating manner.

The visible images required to form one colored copy in the color electrophotographic copying process described with reference to FIG. 1 include visible images in cyan, magenta, and yellow, and a visible image in black, the lowest image densities of these images being selected to be equal to the background density of the image transfer sheet S. The highest image densities of the visible images in cyan and black are selected to be 1.4, the highest image density of the visible image in magenta is selected to be 1.2, and the highest image density of the visible image in yellow is selected to be 1.0. Such density selection is carried out as follows:

The gradation reproduction curve varies with the relative amounts of exposure, developing conditions, image transfer conditions, and other conditions. As an exmaple, the relative amounts of exposure is described here.

The relative amount of exposure is expressed by P/V where P is the amount of exposure of the photosensitive drum to an image and V is the potential to which the photosensitive drum is charged. Therefore, for increasing (reducing) the relative amount of exposure, the amount of exposure P should be increased (reduced), or the charging potential V should be reduced (increased), or the amount of exposure P should be relatively increased (reduced) while the charging potential V should be relatively reduced (increased).

Figure 15:
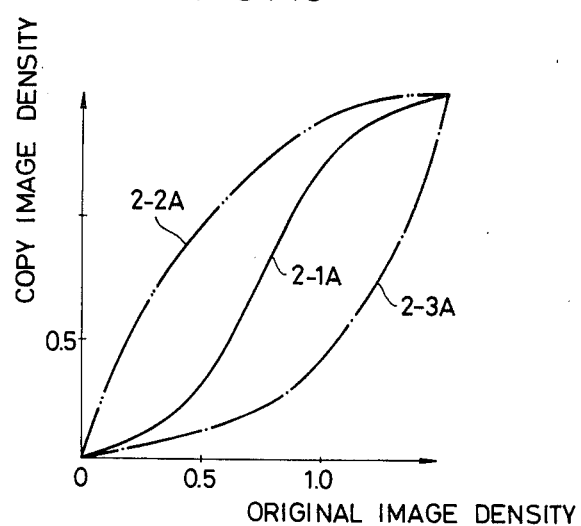
FIGS. 15 and 16 are diagrams explanating another process of gradation compensation.

FIG. 15 shows a gradation reproduction curve 2-1A indicating that an electrostatic latent image is formed with an ordinary relative amount of exposure. As the relative amount of exposure is increased, the gradation reproduction curve is indicated by 2-3A, and as the relative amount of exposure is reduced, the gradation reproduction curve is indicated by 2-2A.

It is assumed that the low density region of an original image which has a density of 0.5 or less is referred to as a highlight area, and the high density region having a density of 1.0 or more is referred to as a shadow area.

Generally, reducing the relative amount of exposure results in an increase in the gradient of the gradation reproduction curve at the highlight area, and increasing the relative amount of exposure results in an increase in the gradient of the gradation reproduction curve at the shadow area.

Now a neutral image, for example, is considered, and it is developed with a black toner and transferred to an image transfer sheet. A method of adjusting the lowest image density of such a visible image to be equal to the background density of the image transfer sheet and also adjusting the highest image density to be 1.4 will be described below. The background density of the image transfer sheet is generally about 0.07, and hence it is regarded as 0 for the sake of brevity. The gradation reproduction curve shown in FIG. 15 is plotted with the background density being 0.

As described above, the colored original O is color-separated into the three primaries of red, green, and blue by the readout optical system prior to the initial color-separated exposure, and read out as it is divided into color and neutral image areas.

The maximum value of the output from the solidstate image pickup device which detects the neutral iamge area corresponds to the lowest image density of the neutral image area, and the minimum value of the output from the solid-state image pickup device corresponds to the highest image density. Thus, the highest and lowest image densities of the neutral image area are detected. The relationship between the output of the solid-state image pickup device and the image density can be known by comparing the output of the solid-state image pickup device with the reference density plate 42. The highest and lowest image densities as descted above are referred to as DM, DN, respectively.

Figure 16:
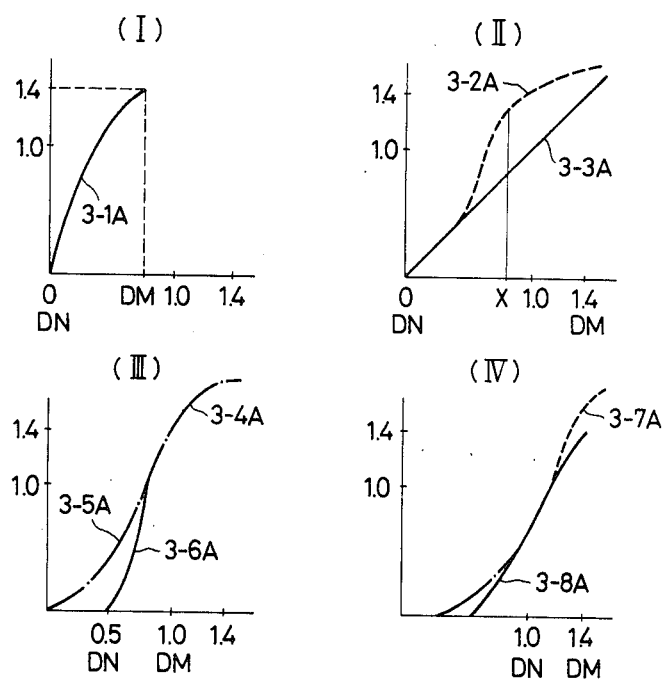

The highest and lowest image densities DM, DN are combined to provide different conditions as follows:

Where DM=0.7 and DN=0.0 as shown in FIG. 16(I), the density of the neutral iamge area is low as a whole. At this time, the relative amount of exposure (which is relativley small) is selected in order to give a gradation reproduction curve 3-1A. The copying process such as charging, exposure to the image, erasing of a color latent image area, developing the latent image with a black toner, and transfer of the visible image to an image transfer sheet, is carried out under the above exposure condition.

Where DN=0 and DM=1.4 as shown in FIG. 16(II), an ideal gradation reproduction curve is indicated by 3-3A, but such an ideal curve does not exist in reality. The relative amount of exposure is selected to be relatively small to achieve a gradation reproduction curve as indicated by 3-2A in FIG. 16(II) for the formation of an electrostatic latent image.

Comparison between the curve 3-2A and the ideal curve 3-3A shows that the electrostatic latent image which gives the gradation reproduction curve 3-2A has an insufficient exposure in the density region except the highlight area.

In order for the density of the copied image corresponding to an image density x on the original to be of a value on the gradation reproduction curve 3-3A, the amount of exposure to be given is determined solely dependent on the image density x and the curve 3-3A. This amount of exposure is assumed here to be $I_0(x)$.

The amount of exposure for the image density x with respect to the gradation reproduction curve 3-2A is assumed to be $I_1(x)$. The difference $I_0(x)-I_1(x)$ is the exposure difference between the gradation reproduction curves 3-2A, 3-3A for the image density x.

The value $(I_0(x)-I_1(x))\times(100/I_0(x))$ is used as an erase ratio IS(x) (%). After an electrostatic latent image is formed so as to accomplish the gradation reproduction curve 3-2A, the electrostatic latent image area corresponding to the neutral image area is erased at the erase ratio IS(x) dependent on the image density x. The gradation reproduction curve of the visible image in black which is eventually obtained is as indicated by 3-3A.

The above erasing is effected in an area-modulating manner.

Actually, the area-modulating erasing is not required to be performed at erase ratios in increments of 1%, but may be conducted sufficiently at erase ratios in increments of about 10%. The erasing in 9 steps will be considered below.

When the erase ratio ranges from 0 to 11%, the erasing of 11% is effected, and when the erase ratio is in the range of from 12 to 23%, the erasing of 23% is effected. Thus, the erase ratio is increased in increments of 11%. When the erase ratio ranges from 89 to 100%, the erasing of 100% is performed.

For effecting such an erasing process, the erase ratio is determined for one unit or matrix of $3\times3$ or 9 pixels. When the erasing is effected for 11%, the latent image is erased one pixel. Each time the erase ratio is increased in an increment of 11%, the number of pixels to be erased is increased by one. For example, when the erase ratio is in the range of from 23 to 34%, the number of pixels to be erased is 3, and three pixels in the $3\times3$ pixel matrix are erased as shown in FIG. 14, as can be understood easily from the foregoing description.

Where DM=1.0, DN=0.5 as shown in FIG. 16(III), the relative amount of exposure is determined in order to achieve a gradation reproduction curve 3-5A. The highlight area and intermediate and low density areas in the neutral image area of an electrostatic latent image formed by the determined amount of exposure are digitally erased so that a final gradation reproduction curve is indicated by 3-6A.

Where DM=1.4, DN=0.5 as shown in FIG. 16(IV), the relative amount of exposure is reduced to form an electrostatic latent image which gives a gradation reproduction curve 3-7A. The low and high image density areas of this electrostatic latent image are digitally erased so that a final gradation reproduction curve is indicated by 3-8A.

Once the combination of DM and DN is determined, therefore, the manner in which an electrostatic latent image is to be formed can be found in order to achieve a desired gradation reproduction curve. In other words, the relative amount of exposure can be determined dependent on the combination of DM and DN. For an electrostatic latent image formed under exposure conditions determined by the combination of DM and DN, the digital erasing conditions can also be solely determined.

Relative amounts of exposure and digital erasing conditions corresponding to combinations of DM and DN (which may be combinations of density levels corresponding to DM and DN) may therefore be stored in the microcomputer, and charging and exposing conditions may be established and the eraser 18 may be controlled dependent on the stored data items. FIG. 16 shows four typical combinations of DM and DN by way of example, and there are actually various combinations available. As an example, the density levels 1 through 16 have 120 combinations.

While the processing of the neutral image area has ben described as an illustrative example, each of the color-separated images of the color image area can be processed in the same manner.

In the process as described above, a gradation reproduction curve is selected dependent on the lowest and highest image densities of the respective color-separated images of the color image area and the neutral image area, and an electrostatic latent image is digitally erased as required for compensation. Accordingly, colored copies appealing in color to the eye can be produced at all times irrespectively of the originals.

The focusing optical element of the eraser may comprise a strip lens array or a roof mirror lens array, instead of the convergent optical transmitting array.

In the arrangement described thus far, the area-modulating digital erasing is effected as well as color compensation and gradation compensation.

Most of originals to be copied are generally documents for business use, and the image density of such originals does not extend continuously from the low density region to the high density region.

Oginals employed as documents for business use have been color-separated and read out, and the results have been checked for image density distributions. It has been found that there are several types of image density distributions. Gradation reproducibility can be improved by establishing an appropriate gradation reproduction curve dependent on the type of the image density distribution.

In such a process, the original is subjected to color separation, and the neutral image area is developed with a black toner.

More specifically, the original is color-separated and read out by the solid-state image pickup device prior to the initial color-separated exposure.

Based on the image information obtained by reading the original, the patterns of density distributions in the respective color-separated images of the color image area and the neutral image area are detected.

Then, gradation reproduction curves respectively for a plurality of visible images required to produce one colored copy are selected and established dependent on the density distribution patterns.

In the color copying process described with reference to FIG. 1, the number of visible images required to produce one colored copy is four, and these visible images are colored in cyan, magenta, yellow, and black.

As described above, the gradation reproduction curve varies dependent on the charging conditions, exposing conditions, developing conditions, and transferring conditions. Now, changing of the exposing conditions will be considered.

The gradation reproduction curve under normal copying conditions is generally as indicated by 2-1 in FIG. 11 or 2-1A in FIG. 15.

The low image density region in which the original image density is 0.5 or lower is referred to as a highlight area, and the high image density region in which the original image density is 1.0 or higher is referred to as a shadow area, as described above. The gradation reproduction curve 2-1A shown in FIG. 15 has a smaller gradient in each of the highlight and shadow areas. Therefore, a visible image produced according to this gradation reproduction curve has poor gradation reproducibility in each of the shadow and highlight areas of the original. However, the gradation in the intermediate image density region of the original can be reproduced well.

Consequently, the gradation reproduction curve 2-1A of FIG. 15 should be selected for originals containing important information mainly in the intermediate image density region. The gradation reproduction curve 2-1A is also suitable for originals having an image of pure black in a white background.

The gradation reproduction curve 2-2A can be obtained by sufficiently reducing the amount of exposure in forming an electrostatic latent image. This gradation reproduction curve 2-2A allows good gradation reproducibility in the highlight area.

The gradation reproduction curve 2-3A can be obtained by increasing the amount of exposure in forming an electrostatic latent image. This gradation reproduction curve 2-3A allows good gradation reproducibility for the intermediate image density or higher density.

Various other gradation reproduction curves can be obtained by varying the amount of exposure. In the following example, however, only the gradation reproduction curves 2-1A, 2-2A, and 2-3A will be used for the sake of brevity, and one of these three gradation reproduction curves will be selected dependent on the density distribution pattern.

(A') Detection of a density distribution pattern

In the apparatus shown in FIG. 1, a colored original is color-separated and read out prior to the exposure of the photosensitive drum. In particular, the color-separation signals R(m, n), G(m, n), and B(m, n) are derived from the pixel (m, n), and converted by the microcomputer to the density levels $L_R(m, n)$, $L_G(m, n)$, and $L_B(m, n)$. These density levels correspond to the image densities of the color-separated images at the pixel (m, n). The original image is then divided into a color image area and a neutral image area, using the density levels.

At this time, the information of the neutral image area of the original O and the information of the color-separated images of the color image area of the original O are available now, these pieces of information being given by the density levels.

For each of the above four pieces of information, the pixles of the same density level are totaled for each of the density levels.

For example, it is assumed that the total number of pixels having the density level 1 in the red image of the color image area is expressed by $X_R(1)$. The total number of pixels having the density level i (i=1 through 16) is expressed by $X_R(i)$. The number $X_R(i)$ then gives a density distribution pattern of the red image. Likewise, the density distribution patterns of green and blue images are expressed by $X_G(i)$ and $X_B(i)$, respectively, and the density distribution pattern of a neutral image area is given as $X_N(i)$.

Figure 17:
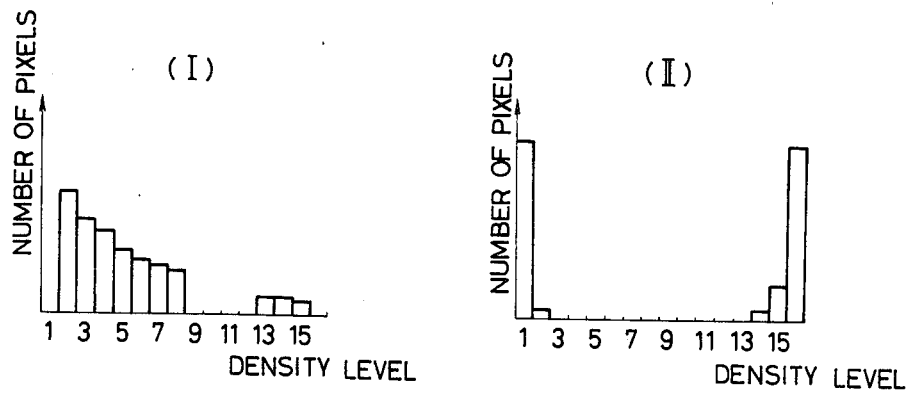
FIGS. 17 and 18 are diagrams explanating still another process of gradation compensation.

It is assumed that the pattern $X_R(i)$ is expressed as a histogram as shown in FIG. 17 at (I). Since the density level 9 corresponds to the density 0.5 (see the table 1), most of the image information in the pattern of FIG. 17(I) concentrates in the highlight area. Therefore, the gradation reproduction curve 2-2A of FIG. 15 should be selected in this case.

If the density distribution pattern of the neutral image area is as shown in FIG. 17(II), for example, then it can easily be understood that the gradation reproduction curve 2-1A should be selected.

(B') Selection of a gradation reproduction curve

When image density distribution patterns $X_R(i)$, $X_G(i)$, $X_B(i)$, and $X_N(i)$ (i=1 through 16) are obtained, then an appropriate gradation reproduction curve should be selected dependent on each of the image density distribution patterns. Although there are various methods of selecting the gradation reproduction curve, a method of using a discrinantal function for curve selection will be described below.

Figure 18:
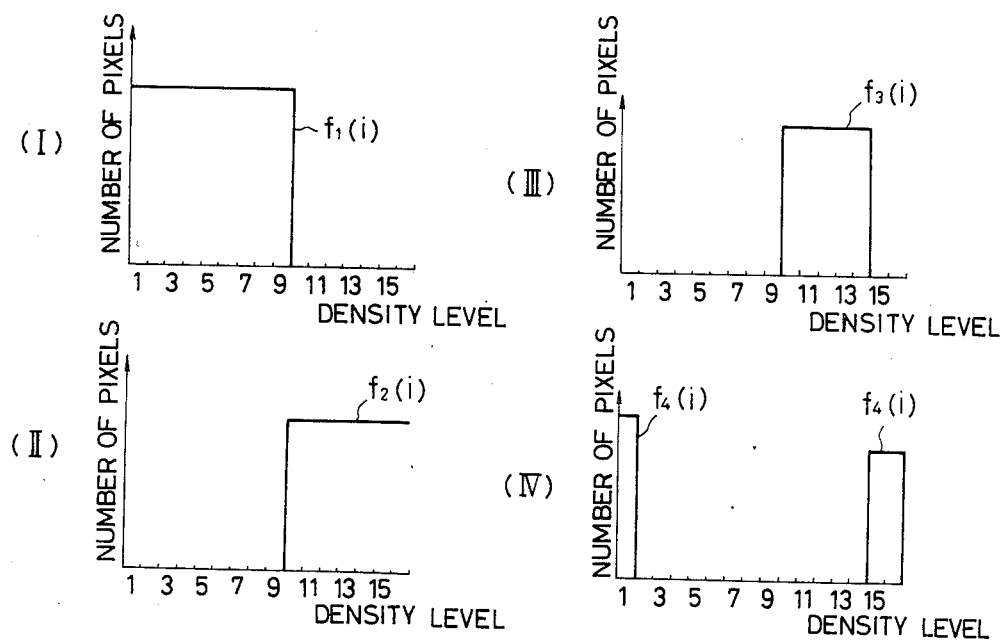

Functions $f_1(i)$, $f_2(i)$, $f_3(i)$, and $f_4(i)$ shown in FIG. 18 are called discriminantal functions. The function $f_1(i)$ corresponds to the gradation reproduction curve 2-2A, the function $f_2(i)$ corresponds to the gradation reproduction curve 2-3A, and the functions $f_3(i)$, $f_4(i)$ corresponds to the gradation reproduction curve 2-1A. If the image density pattern is as indicated by $f_1(i)$, then the gradation of the information on the original (which concentrates in the highlight area) can be reproduced well by selecting the gradation reproduction curve 2-2A. Accordingly, it is determined which discriminantal function is analogous to the image density distribution pattern $X_R(i)$ or the like that has been obtained by reading the original.

The above process will be described more specifically. Take the pattern $X_R(i)$, for example. First, $$Y_{Rj} = \sum_{i=1}^{16} (f_j(i) - X_R(i))^2 \ (j = 1 \text{ through } 4)$$

is computed, and the smallest of $Y_{R1}$, $Y_{R2}$, $Y_{R3}$, and $Y_{R4}$ is determined. If $Y_{R4}$ is the smallest, then the pattern $X_R$ is judged as being most analogous to the discriminantal function $f_4(i)$, and the gradation reproduction curve 2-1A is selected. If $Y_R(i)$ is as indicated in FIG. 17(I), then it is judged as being most analogous to the discriminantal function $f_1(i)$, and the gradation reproduction curve 2-2A is selected.

The patterns $X_G(i)$, $X_B(i)$, and $X_N(i)$ are similarly processed.

The above process of the present invention as carried out on the apparatus shown in FIG. 1 will briefly be described hereinbelow.

First, the original O is read out to discriminate the respective color-separated images of a color image area, and a neutral image area. The individual color-separated images and the image density distribution pattern in the neutral image area are detected, and the gradation reproduction curve dependent on the detected pattern is selected.

It is now assumed that the gradation reproduction curves 2-2A, 2-2A, 2-3A, and 2-1A are selected for the red, green, and blue images of the color image area, and the neutral image area.

The microcomputer then establishes exposing conditions, i.e., the amount of light to be emitted from the lamp 140, in order to achieve the gradation reproduction curve 2-2A.

Thereafter, the copying process is started.

First, the original O is color-separated in red by the filter F1, and the image is developed with a cyan toner.

The visible image in cyan as transferred to the image transfer sheet S has a gradation reproduction curve 2-2A (FIG. 15). The neutral latent image area of the electrostatic latent image is erased by the eraser 18.

Then, the original O is color-separated in green by the filter F2, and the neutral image area of the color-separated latent image is erased. The image is developed with a magenta toner, and the visible image is transferred to the image transfer sheet S.

The original O is color-separated in blue by the filter F3, and the neutral image area of the color-separated latent image is erased. The image is developed with a yellow toner, and the visible image is transferred to the image transfer sheet S. At this time exposing conditions are established so as to achieve the gradation reproduction curve 2-3A.

Subsequently, the microcomputer establishes exposing conditions so that the gradation reproduction curve 2-1A will be achieved. An electrostatic latent image is formed through the ND filter F4, and the color latent image area is erased. The image is developed with a black toner, and the visible image in black is transferred to the image transfer sheet S. The colored image is fixed to the image transfer sheet S which is then discharged from the apparatus, whereupon the copying process is completed.

In the above method of gradation compensation, the original is color-separated and read, and the density distribution patterns of the respective color-separated images of the color image area, and the neutral image area are detected. The gradation reproduction curve is selected dependent on the detected patterns. As a consequence, appropriate gradation compensation can be effected in the color copying process.

While there are three gradation reproduction curves to choose from in the above description, four or more gradation reproduction curves may be employed.

The reference gradation curve used as a reference relationship between the output of the solid-state image pickup device and the density has been shown as being inclined at 45 degrees. However, various reference gradation curves may be employed, and one of them may be selected as desired.

The above-described technique for gradation compensation is also highly effective for monochromatic copying process.

Although certain preferred embodiments have been shown and described, it should be understood that many changes and modifications may be made therein without departing from the scope of the appended claims.

What is claimed is:

1. A color electrophotographic copying process utilizing the Carlson process, comprising the steps of:
reading a colored original with a solid-state image pickup device wherein said image pickup device includes a plurality of photographic elements which are covered with respectively red, green and blue filters which are cyclically arranged;
color-separating said colored original;
determining an amount of masking for a color-separated latent image to be masked, based on image information read in said reading step; and
partially erasing the color-separated latent image to be masked in an area-modulating manner with an eraser comprising a light-emitting dot array at an erase ratio depending on the determined amount of masking wherein said light-emitting dot array includes an array of light-emitting elements extending transversely from a photosensitive body wherein said light-emitting elements are turned on and off simultaneously to form a light-spot image wherein said light-spot image is formed by said area-modulating manner of partially erasing with said light-emitting elements being turned on and off without modulation of the light intensities of said elements.

2. A color electrophotographic copying process according to claim 1, wherein amounts of masking are computed in advance and stored, and a prescribed amount of masking is selected from the stored amounts of masking dependent on the image information read in said reading step.

3. A color electrophotographic copying process according to claim 2, wherein said original is color-separated in red, green, and blue, said amount of masking being computed using a masking ratio which is A=0.38 for a magenta latent image and B=0.45 for a yellow latent image.

4. A color electrophotographic copying process according to claim 1, wherein said color-separated latent image is partially erased for each unit of 2×2 pixels in increments of 25%.

5. A color electrophotographic copying process according to claim 1, wherein said color-separated latent image is partially erased for each unit of 4×4 pixels in an area-modulating manner, said pixels in said each unit being determined by a dithered matrix or a submatrix.

6. A color electrophotographic copying process utilizing the Carlson process, comprising the steps of:
reading a colored original with a solid-state image pickup device, said pickup device including an array of photo detector elements wherein said photo detector elements are covered with, respectively, red, green and blue filters which are cyclically arranged;
color-separating said colored original;
detecting a boundary of the image on the original based on image information read in said reading step;
determining an amount of masking for a color-separated latent image to be masked, based on said image information; and
partially erasing the color-separated latent image to be masked in an area-modulating manner with an eraser comprising a light-emitting dot array at an erase ratio dependent on the determined amount of masking, said color-separated latent image at said boundary being not erased with said eraser and wherein said light-emitting dot array comprises an array of minute light-emitting elements extending transversely from a photosensitive body wherein said light-emitting elements are turned on and off substantially. simultaneously to form a light-spot image by said area-modulating manner of partial erasing and wherein said light-emitting elements are turned on and off without modulation of the light intensity of said elements.

7. A color electrophotographic copying process according to claim 6, wherein amounts of masking are computed in advance and stored, and a prescribed amount of masking is selected from the stored amounts of masking dependent on the image information read in said reading step.

8. A color electrophotographic copying process according to claim 7, wherein said original is color-separated in red, green, and blue, said amount of masking being computed using a masking ratio which is A=0.38 for a magenta latent image and B=0.45 for a yellow latent image.

9. A color electrophotographic copying process according to claim 6, wherein said color-separated latent image is partially erased for each unit of 2×2 pixels in increments of 25%.

10. A color electrophotographic copying process according to claim 6, wherein said color-separated latent image is partially erased for each unit of 4×4 pixels in an area-modulating manner, said pixels in said each unit being determined by a dithered matrix or a submatrix.

11. A color electrophotographic copying process utilizing the Carlson process, comprising the steps of:
color-separating a colored original and reading the same with a solid-state image pickup device prior to the step of color-separating and wherein said solid-state image pickup device comprises a plurality of minute photo detector elements wherein said photo detector elements are covered, respectively, with red, green and blue filters which are cyclically arranged;
determining a digital erase ratio respectively for a plurality of electrostatic latent images required to produce a single colored copy, based on image imformation read in said reading step; and
digitally erasing said electrostatic latent images in an area-modulating manner with an eraser composing a light-emitting dot array based on said respective digital erase ratios determined in said determining step wherein said light-emitting dot array comprises an array of light-emitting elements extending transversely from a photosensitive body wherein said light-emitting elements are turned on and off simultaneously to form a light-spot image by the area-modulating manner of erasing with said turning on and turning off of said elements being accomplished without modulation of the intensities of said elements, whereby an electrostatic latent image having a relatively insufficient exposure is formed under prescribed charging conditions and/or exposing conditions.

12. A color electrophotographic copying process according to claim 11, wherein said electrostatic latent images are digitally erased for each unit of 3×3 pixels in nine stages.

13. A color electrophotographic copying process utilizing the Carlson process wherein a colored original is color-separated and a neutral image area is developed with a black toner, comprising the steps of:
color-separating the colored original and reading the same with a solid-state image pickup device prior to an initial step of color- separating wherein said solid-state image pickup device comprises an array of photo detector elements covered with, respectively, red, green and blue filters which are cyclically arranged;
detecting highest and lowest densities of respective color-separated images of a color image area, and the neutral image area, based on image information read in said reading step;
reading, prior to forming electrostatic latent images, information of said colored original to detect yellow, magenta, and cyan color information and to detect neutral information for a black toner based on said detected yellow, magenta and cyan color information; and
adjusting relative amounts of exposure at the time of forming electrostatic latent images corresponding respectively to a plurality of individual visible images required to produce a single colored copy, so that the lowest image density will be equal to the background density of an image transfer sheet and the highest image density will be of a prescribed value, and digitally erasing said electrostatic latent images as required in an area-modulating manner.

14. A color electrophotographic copying process according to claim 13, wherein said electrostatic latent images are digitally erased for each unit of 3×3 pixels in nine stages.

15. The copying process according to claim 13 wherein a dot array of light-emitting elements is employed as a common light source for forming light-spot images by area modulation and for completely erasing the color image area and the neutral image area which are separated from each other whereby such image formation and erasing are effected simulataneously.

16. A color electrophotographic copying process utilizing the Carlson process wherein a colored original is color-separated and a neutral image area is developed with a black toner, comprising the steps of:
color-separating the colored original and reading the same with a solid-state image pickup device prior to an initial step of color-separating, wherein said solid-state image pickup comprises an array of photo detector elements each covered with filters which are respectively red, green and blue and are cyclically arranged;
detecting density distribution patterns of respective color-separated images of a color image area, and the neutral image area, based on image information read in said reading step;
reading, prior to forming color-separated latent images, information of the colored original to detect yellow, magenta, and cyan color information, and also to detect neutral image information for a black toner based on the detected yellow, magenta and cyan color information; and
selecting gradation reproduction curves respectively for a plurality of individual visible images required to produce a single colored copy, dependent on said density distribution patterns.

* * * * *